(12) United States Patent
Thangaraj et al.

(10) Patent No.: US 8,929,458 B2
(45) Date of Patent: Jan. 6, 2015

(54) COMPRESSED STRUCTURE FOR SLICE GROUPS IN START CODE TABLE

(75) Inventors: Arul Thangaraj, Bangalore (IN); Vijayanand Aralaguppe, Bangalore (IN); Syed Mohammed Ali, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 1296 days.

(21) Appl. No.: 10/816,724

(22) Filed: Apr. 1, 2004

(65) Prior Publication Data

US 2005/0175107 A1 Aug. 11, 2005

Related U.S. Application Data

(60) Provisional application No. 60/542,575, filed on Feb. 5, 2004.

(51) Int. Cl.
| | |
|---|---|
| H04N 7/12 | (2006.01) |
| H04N 21/43 | (2011.01) |
| H04N 21/434 | (2011.01) |
| H04N 19/44 | (2014.01) |
| H04N 19/70 | (2014.01) |
| H04N 19/423 | (2014.01) |

(52) U.S. Cl.
CPC ......... *H04N 21/4305* (2013.01); *H04N 21/434* (2013.01); *H04N 19/00533* (2013.01); *H04N 19/00884* (2013.01); *H04N 19/00484* (2013.01)
USPC ..................................................... 375/240.25

(58) Field of Classification Search
CPC .................. H04N 19/00484; H04N 19/00533; H04N 19/00884; H04N 21/4305; H04N 21/434
USPC ..................................... 386/101; 375/240.25
See application file for complete search history.

(56) References Cited

U.S. PATENT DOCUMENTS

| | | | | |
|---|---|---|---|---|
| 5,566,089 | A | * | 10/1996 | Hoogenboom ............... 358/1.15 |
| 5,815,206 | A | * | 9/1998 | Malladi et al. ............ 375/240.01 |
| 7,096,481 | B1 | * | 8/2006 | Forecast et al. .................. 725/32 |
| 7,349,428 | B2 | * | 3/2008 | Hulmani et al. .............. 370/466 |
| 2003/0009722 | A1 | * | 1/2003 | Sugiyama et al. ............ 714/779 |

* cited by examiner

*Primary Examiner* — Anner Holder
(74) *Attorney, Agent, or Firm* — Foley & Lardner LLP

(57) ABSTRACT

Presented herein is a compressed structure for writing slice group start codes into a start code table, for use with a video decoding system. One or more start codes are written to a start code table. The presentation time information is written to the start code table.

23 Claims, 7 Drawing Sheets

300

| Byte | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Data | Code 0 | Code 1 | CDB0 Addr. | CDB1 Addr. | CDB2 Addr. | CDB3 Addr. | Error byte 0 | Error byte 1 | Null | Null | Null | Null | Null | Null | Null | Null |

| Byte | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Data | Code 0 | Code 1 | Flag byte 0 | Flag byte 1 | PTS0 Value | PTS1 value | PTS2 value | PTS3 value | PTS4 value | DTS0 value | DTS1 value | DTS2 value | DTS3 value | DTS4 value | Null | Null |

| Byte | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Data | Code 0 | Code 1 | Flag byte 0 | Flag byte 1 | BTP Cmd 0 | BTP Cmd 1 | BTP Cmd2 | BTP Cmd3 | BTP Cmd4 | BTP Cmd5 | BTP Cmd6 | BTP Cmd7 | PCR0 offset | PCR1 offset | PCR2 offset | PCR3 offset |

| Byte | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Data | Code 0 | Code 1 | SC0 Value | Byte offset0 | SC1 Value | Byte offset1 | SC2 Value | Byte offset 2 | SC3 Value | Byte offset 3 | SC4 Value | Byte offset 4 | SC5 Value | Byte offset 5 | SC6 Value | Byte offset 6 |

| Byte | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Gword0 | 00 | 00 | CDB address | CDB address | CDB address | CDB address | Error byte | Error byte | | | | | | | | |
| Gword1 | 00 | 01 | Flag byte | Flag byte | PTS Value | PTS value | PTS value | PTS value | PTS value | DTS value | DTS value | DTS value | DTS value | DTS value | | |
| Gword2 | 00 | 02 | Flag byte | Flag byte | BTP Cmd | BTP Cmd | BTP Cmd | BTP Cmd | BTP Cmd | BTP Cmd | BTP Cmd | BTP Cmd | PCR offset | PCR offset | PCR offset | PCR offset |
| Gword3 | 00 | 03 | NSL1 | Offset1 | SL1 | Offset2 | SL2 | Offset3 | SL3 | Offset4 | XX | 0xff | | | | |

FIGURE 6

| Byte | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Gword0 | 00 | 00 | CDB address | CDB address | CDB address | CDB address | Error byte | Error byte | | | | | | | | |
| Gword1 | 00 | 03 | NSL1 | Offset1 | SL1 | Offset2 | SL2 | Offset3 | SL3 | Offset4 | XX | 0xff | | | | |

FIGURE 7

| Byte | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Gword0 | 00 | 00 | CDB address | CDB address | CDB address | CDB address | Error byte | Error byte | | | | | | | | |
| Gword1 | 00 | 03 | SL1 | Offset1 | SL2 | Offset2 | SL3 | Offset3 | XX | 0xff | | | | | | |

FIGURE 8

| Byte | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Gword0 | 00 | 00 | CDB address | CDB address | CDB address | CDB address | Error byte | Error byte | | | | | | | | |
| Gword1 | 00 | 01 | Flag byte | Flag byte | PTS Value | PTS value | PTS value | PTS value | PTS value | DTS value | DTS value | DTS value | DTS value | DTS value | | |
| Gword2 | 00 | 02 | Flag byte | Flag byte | BTP Cmd | BTP Cmd | BTP Cmd | BTP Cmd | BTP Cmd | BTP Cmd | BTP Cmd | BTP Cmd | PCR offset | PCR offset | PCR offset | PCR offset |
| Gword3 | 00 | 03 | NSL1 | Offset1 | SL1 | Offset2 | NSL2 | Offset3 | SL2 | Offset4 | XX | 0xff | | | | |

| Byte | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Gword0 | 00 | 00 | CDB address | CDB address | CDB address | CDB address | Error byte | Error byte | | | | | | | | |
| Gword1 | 00 | 02 | Flag byte | Flag byte | BTP Cmd | BTP Cmd | BTP Cmd | BTP Cmd | BTP Cmd | BTP Cmd | BTP Cmd | BTP Cmd | PCR offset | PCR offset | PCR offset | PCR offset |
| Gword2 | 00 | 03 | NSL1 | Offset1 | SL1 | Offset2 | XX | 0xff | | | | | | | | |
| Gword3 | 00 | 01 | Flag byte | Flag byte | PTS Value | PTS value | PTS value | PTS value | PTS value | DTS value | DTS value | DTS value | DTS value | DTS value | | |
| Gword4 | 00 | 03 | NSL2 | Offset3 | SL2 | Offset4 | XX | 0xff | | | | | | | | |

FIGURE 9

| Byte | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Gword0 | 00 | 00 | CDB address | CDB address | CDB address | CDB address | Error byte | Error byte | | | | | | | | |
| Gword1 | 00 | 01 | Flag byte | Flag byte | PTS Value | PTS value | PTS value | PTS value | PTS value | DTS value | DTS value | DTS value | DTS value | DTS value | | |
| Gword2 | 00 | 02 | Flag byte | Flag byte | BTP Cmd | BTP Cmd | BTP Cmd | BTP Cmd | BTP Cmd | BTP Cmd | BTP Cmd | BTP Cmd | PCR offset | PCR offset | PCR offset | PCR offset |
| Gword3 | 00 | 03 | NSL1 | Offset1 | SL1 | Offset2 | NSL2 | Offset3 | SL2 | Offset4 | NSL3 | Offset5 | SL3 | Offset6 | NSL4 | Offset7 |
| Gword4 | 00 | 03 | SL4 | Offset8 | NSL5 | Offset9 | SL5 | Offset10 | NSL6 | Offset11 | SL6 | Offset12 | XX | 0xff | | |

FIGURE 10

| Byte | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Gword0 | 00 | 00 | CDB address | CDB address | CDB address | CDB address | Error byte | Error byte | | | | | | | | |
| Gword1 | 00 | 03 | SL1 | Offset1 | SL2 | Offset2 | SL3 | Offset3 | XX | 0xff | | | | | | |
| Gword2 | 00 | 01 | Flag byte | Flag byte | PTS Value | PTS value | PTS value | PTS value | PTS value | DTS value | DTS value | DTS value | DTS value | DTS value | | |
| Gword3 | 00 | 02 | Flag byte | Flag byte | BTP Cmd | BTP Cmd | BTP Cmd | BTP Cmd | BTP Cmd | BTP Cmd | BTP Cmd | BTP Cmd | PCR offset | PCR offset | PCR offset | PCR offset |
| Gword4 | 00 | 03 | NSL1 | Offset4 | SL4 | Offset5 | XX | 0xff | | | | | | | | |

COMPRESSED STRUCTURE FOR SLICE GROUPS IN START CODE TABLE

RELATED APPLICATIONS

This application claims priority to Provisional Application for Patent Ser. No. 60/542,575, "Compressed Structure for Slice Groups in Start Code Table", filed Feb. 5, 2004 by Thangaraj, et. al., and incorporated herein by reference.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

During the decoding of video data, the video data includes sets of data structures, such as transport packets, packetized elementary streams, elementary streams, group of pictures, pictures, slices, macroblocks, and blocks. Start codes indicate the starting points for groups of pictures, pictures, and slices.

The video includes parameters known as presentation time stamps (PTS) and decode time stamps (DTS) in the header of a packetized video elementary stream. The PTS and DTS indicate the time that the next picture is to be decoded and presented for display, respectively. The video decoder compares the PTS and DTS against a program clock reference (PCR) to decode and present the picture for display.

A processor known as the video transport processor parses the headers of the transport packets, and the packetized elementary stream, and writes the video elementary stream into a memory known as a compressed data buffer. When the video transport processor writes the video elementary stream into the compressed data buffer, the video transport processor also maintains a table that records the address in the compressed data buffer to which each start code is written.

When the video decoder selects a data structure for decoding, the video decoder looks up the start code of the data structure in the start code table to determine the address storing the start code. The video decoder then fetches data starting from the address.

Because the PTS and DTS are in the header of the packetized video elementary sequence, the PTS, DTS, and PCR offset can be placed after the start code in the compressed data buffer for the first start code following a non-slice start code. Insertion of the PTS, DTS, and PCR offset in the compressed data buffer increases the number of bytes that need to be written. Each insertion after a non-slice start code could add as many as 17 bytes of data. When a transport packet contains a large number of non-slice start codes, insertion leads to compressed data going beyond 256 bytes. Accordingly, two DRAM access per packet are done in this case.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Presented herein is a compressed structure for writing slice group start codes into a start code table.

In one embodiment, there is presented a method for decoding video data. The method comprises writing one or more start codes to a start code table; and writing presentation time information to the start code table.

In another embodiment, there is presented a circuit for decoding video data. The circuit comprises a start code table and a video transport processor. The start code table stores start codes and comprises a plurality of data words. The video transport processor writes a plurality of start codes to a particular data word in the start code table.

In another embodiment, there is presented an article of manufacture. The article of manufacture comprises a machine readable medium. The machine readable medium stores a plurality of executable instructions. The plurality of executable instructions are for writing one or more start codes to a start code table; and for writing presentation time information to the start code table.

These and other features and advantages of the present invention may be appreciated from a review of the following detailed description of the present invention, along with the accompanying figures in which like reference numerals refer to like parts throughout.

BRIEF DESCRIPTION OF SEVERAL VIEWS OF THE DRAWINGS

FIG. 3A is a block diagram describing an exemplary base address entry in accordance with an embodiment of the present invention;

FIG. 3B is a block diagram of an exemplary PTS/DTS entry in accordance with an embodiment of the present invention;

FIG. 3C is a block diagram of a BTP Command and PCR Offset entry in accordance with an embodiment of the present invention;

FIG. 3D is a block diagram of a start code entry in accordance with an embodiment of the present invention;

FIG. 5 is a block diagram of an exemplary start code table entry for a particular sequence of start codes;

FIG. 6 is a block diagram of another exemplary start code table entry for another particular sequence of start codes;

FIG. 7 is a block diagram of another exemplary start code table entry for another particular sequence of start codes;

FIG. 8 is a block diagram of another exemplary start code table entry for another particular sequence of start codes;

FIG. 9 is a block diagram of another exemplary start code table entry for another particular sequence of start codes;

FIG. 10 is a block diagram of another exemplary start code table entry for another particular sequence of start codes; and FIG. 11 is a block diagram of another exemplary start code table entry for another particular sequence of start codes.

DETAILED DESCRIPTION OF THE INVENTION

Figure 1:
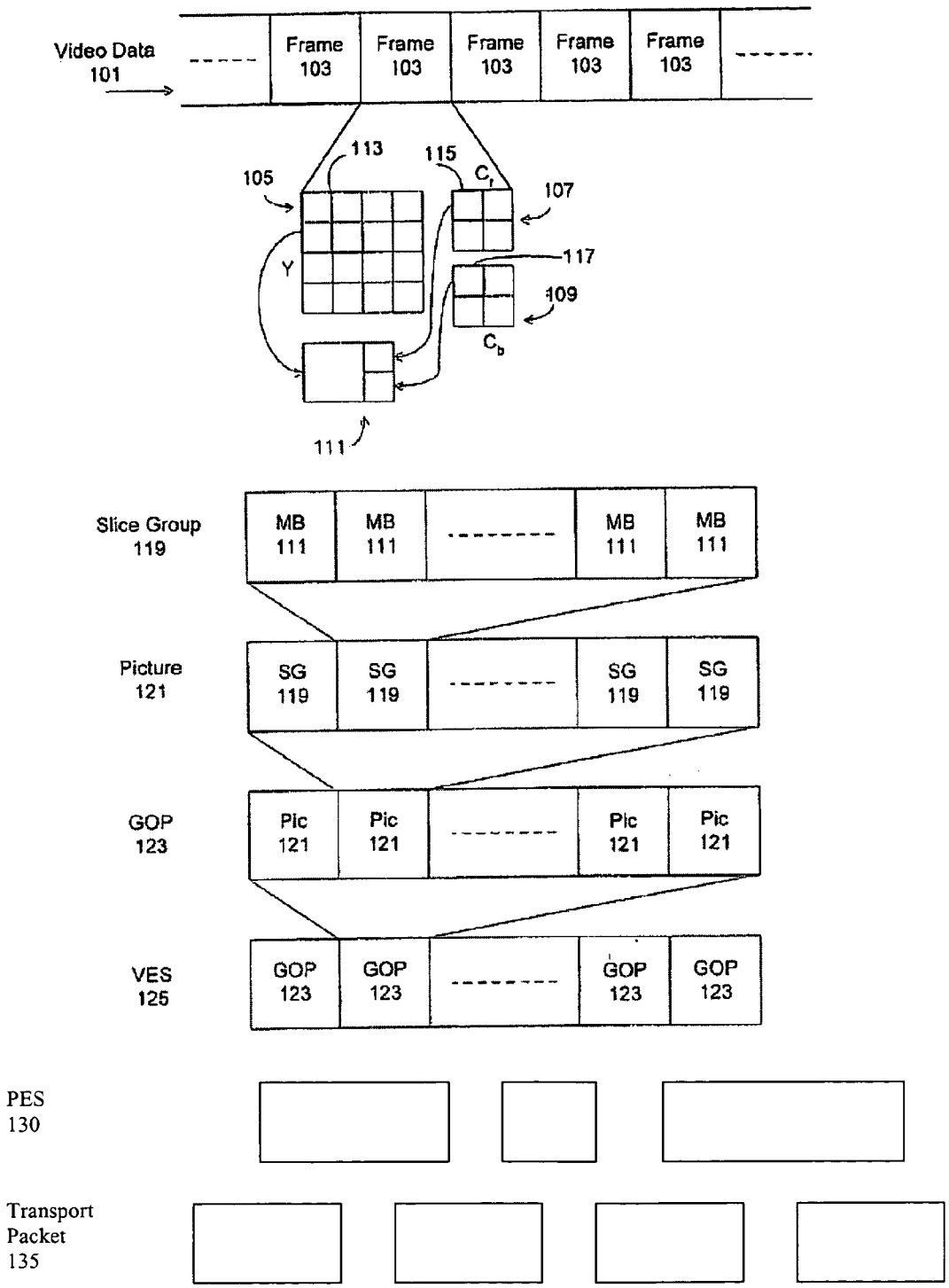
FIG. 1 illustrates a block diagram of an exemplary Moving Picture Experts Group (MPEG) encoding process, in accordance with an embodiment of the present invention.

FIG. 1 illustrates a block diagram of an exemplary Moving Picture Experts Group (MPEG) encoding process of video data 101, in accordance with an embodiment of the present invention. The video data 101 comprises a series of frames 103. Each frame 103 comprises two-dimensional grids of luminance Y, 105, chrominance red Cr, 107, and chrominance blue $C_b$, 109, pixels. The two-dimensional grids are divided into 8×8 blocks, where a group of four blocks or a 16×16 block 113 of luminance pixels Y is associated with a block 115 of chrominance red $C_r$, and a block 117 of chrominance blue $C_b$ pixels. The block 113 of luminance pixels Y, along with its corresponding block 115 of chrominance red pixels $C_r$, and block 117 of chrominance blue pixels $C_b$ form a data structure known as a macroblock 111. The macroblock 111 also includes additional parameters, including motion vectors, explained hereinafter. Each macroblock 111 represents image data in a 16×16 block area of the image.

The data in the macroblocks 111 is compressed in accordance with algorithms that take advantage of temporal and spatial redundancies. For example, in a motion picture, neighboring frames 103 usually have many similarities. Motion causes an increase in the differences between frames, the difference being between corresponding pixels of the frames, which necessitate utilizing large values for the transformation from one frame to another. The differences between the frames may be reduced using motion compensation, such that the transformation from frame to frame is minimized. The idea of motion compensation is based on the fact that when an object moves across a screen, the object may appear in different positions in different frames, but the object itself does not change substantially in appearance, in the sense that the pixels comprising the object have very close values, if not the same, regardless of their position within the frame. Measuring and recording the motion as a vector can reduce the picture differences. The vector can be used during decoding to shift a macroblock 111 of one frame to the appropriate part of another frame, thus creating movement of the object. Hence, instead of encoding the new value for each pixel, a block of pixels can be grouped, and the motion vector, which determines the position of that block of pixels in another frame, is encoded.

Accordingly, most of the macroblocks 111 are compared to portions of other frames 103 (reference frames). When an appropriate (most similar, i.e. containing the same object(s)) portion (reference pixels) of a reference frame 103 is found, the difference between the portion of the reference frame 103 and the macroblock 111 are encoded. The difference is known as the prediction error. The location of the reference pixels in the reference frame 103 is recorded as a motion vector. The encoded difference and the motion vector form part of the data structure encoding the macroblock 111. In the MPEG-2 standard, the macroblocks 111 from one frame 103 (a predicted frame) are limited to prediction from portions of no more than two reference frames 103. It is noted that frames 103 used as a reference frame for a predicted frame 103 can be a predicted frame 103 from another reference frame 103.

The macroblocks 111 representing a frame are grouped into different slice groups 119. The slice group 119 includes the macroblocks 111, as well as additional parameters describing the slice group. Each of the slice groups 119 forming the frame form the data portion of a picture structure 121. The picture 121 includes the slice groups 119 as well as additional parameters that further define the picture 121.

The pictures are then grouped together as a group of pictures (GOP) 123. The GOP 123 also includes additional parameters further describing the GOP. Groups of pictures 123 are then stored, forming what is known as a video elementary stream (VES) 125. The VES 125 is then packetized to form a packetized elementary sequence 130.

The packetized elementary sequence 130 includes presentation time stamps and decode time stamps that indicate the time that the first following picture is to be decoded and presented for display. The packetized elementary stream is further packetized into fixed 192-byte (including a 4 byte header, and 188-bytes of data) packets, known as transport packets 135.

The transport packets 135 can be multiplexed with other transport packets carrying other content, such as another video elementary stream 125 or an audio elementary stream. The multiplexed transport packets 135 form what is known as a transport stream. The transport stream is transmitted over a communication medium for decoding and displaying.

Figure 2:
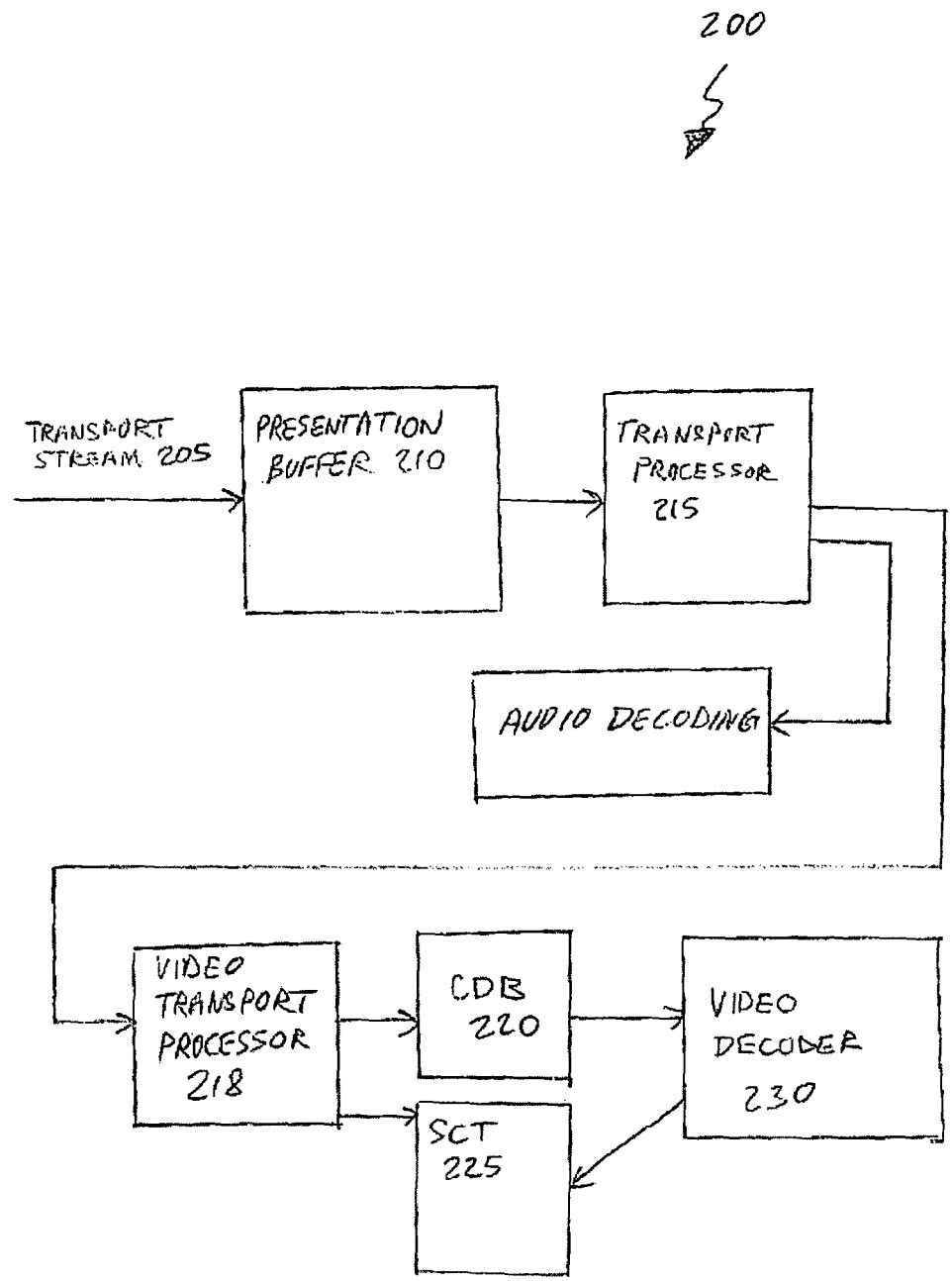
FIG. 2 is a block diagram of an exemplary decoder system in accordance with an embodiment of the present invention.

Referring now to FIG. 2, there is illustrated a block diagram describing an exemplary decoder system 200 in accordance with an embodiment of the present invention. The decoder system 200 receives a transport stream 205 and stores the transport stream 205 in a transport stream presentation buffer 210. The transport stream presentation buffer 210 can comprise memory, such as synchronous dynamic random access memory (SD-RAM).

A transport processor 215 demultiplexes the transport stream 205 into constituent elementary streams. For example the transport stream can comprise any number of video and audio elementary stream constituents. Additionally, the transport processor 215 parses and processes the transport header information from the transport streams stored in the transport stream presentation buffer 210. The constituent audio elementary streams can be provided to an audio decoding section of the decoder system 200.

A video transport processor 218 parses the headers of the transport packets, and the packetized elementary stream. Additionally, the video transport processor 218 writes video elementary stream 125 to a compressed data buffer 220. As noted above, the video elementary stream 125 comprises a hierarchy of various structures, such as GOPs 123, pictures 121, slice groups 119, and macroblocks 111. The starting point of the foregoing is indicated in the video elementary stream 125 by what is known as a start code.

As the transport processor 218 writes the video elementary stream 125 to the compressed data buffer 220, the transport processor 215 also maintains a start code table 225. The start code table 225 comprises a memory storing records of start codes and the addresses in the compressed data buffer 220 storing the start code and will be described in greater detail below. The memory can comprise, for example, a plurality of 16 byte data words, known as Gigantic Words (gwords).

A video decoder 230 decodes the video elementary stream 125 stored in the compressed data buffer 220. The video decoder 230 decodes the video elementary stream 125 on a picture-by-picture basis, and decodes the pictures on a slice-by-slice basis. As noted above, the PTS and DTS in the header of the packetized video elementary stream 130 indicate the time to decode and present a picture for display.

Because the PTS and DTS are in the header of the packetized video elementary sequence, the video transport processor 218 writes the PTS, DTS, and PCR offset in the start code table. The video decoder 230 uses the foregoing values to decode and present the pictures for display.

The format for writing entries in the start code table for start codes in a transport packet will now be described. The entries for start codes in a transport packet can include a base address entry, a PTS/DTS entry, a BTP and PCR Offset Entry, and a start code entry.

Base Address Entry—There is one base address entry per transport packet if there are one or more start codes in the transport packet. This entry contains the compressed data buffer address pointing to the first byte of the packet payload. The base address can be used along with the byte offset provided in the start code entry (described below) to calculate the byte address of the start of each the first non-slice start code that follows a slice start code.

PTS/DTS—This entry is created for each new PTS/DTS that is received in the transport packet with an associated Non Slice start code.

BTP Command and PCR offset Entry—There is one BTP command and Program Clock Reference (PCR) Offset Entry per transport packet if a Non Slice start code is present in the transport packet. This entry can be made for every change in PCR offset and also whenever the PCR offset parameter, PCR_offset, validity changes (ie., Valid to invalid transition and Invalid to Valid transition). For simplicity, a PCR_OFFSET entry can be forced once for the first Non-slice detected in a packet. This way it ensures that the information on the transitions are not missed.

Start Code Entry—Each entry can hold the byte offset for maximum 7 start codes. 0xFF in the offset section of the start code indicates the end of the valid start codes.

Referring now to FIG. 3, there is illustrated a block diagram describing an exemplary base address entry 300 in accordance with an embodiment of the present invention. The base address entry 300 consumes a single gword comprising 16 bytes, Byte 15 . . . 0. The base address entry 300 includes a code, code 0, code 1, indicating that the gword stores a base address entry 300 in the first two bytes, Byte 15, 14.

The byte address, CDB0 Addr., CDB1 Addr., CDB2 Addr., CDB3 Addr., in the compressed data buffer storing the beginning of the transport, packet payload follows the code, code 0, code 1, and is stored in the next four bytes, Bytes 13, 12, 11, 10.

The next two bytes, Bytes 9 and 8, store indicators, Error byte 0, Error byte 1, that indicate to the video decoder the errors detected in the Transport layer. The errors can include, but are not limited to, a continuity counter error, a CDB Overflow, or an SCT Buffer Overflow. The remaining bytes, Bytes 7 . . . 0, can be used for other purposes, or not be used at all.

Referring now to FIG. 3B, there is illustrated a block diagram describing an exemplary PTS/DTS Entry 325. If the transport packet includes a PTS and DTS value and an associated non-slice start code, the video transport processor writes a PTS/DTS entry 325 into the compressed data buffer. The PTS/DTS Entry 325 consumes a gword comprising 16 bytes, Bytes 15 . . . 0. The first two bytes, Bytes 15, 14, store a code, code 0, code 1, indicating that the gword stores a PTS/DTS entry.

The next two bytes, Bytes 13 and 12, store flag bytes, Flag byte 0, Flag byte 1, to indicate the validity of the PTS and DTS values in the entry. The next five bytes, Bytes 11 . . . 7 store the PTS value in the transport packet, PTS0 . . . PTS4. The next five bytes, Bytes 6 . . . 2 store the DTS value in the packet, DTS0 . . . DTS4.

Referring now to FIG. 3C, there is illustrated a block diagram describing an exemplary BTP command and PCR offset entry 350. One BTP Command and PCR Offset Entry 350 is written for a transport packet, if the transport packet includes at least one non-slice start code.

The BTP Command and PCR Offset Entry 350 consumes a gword comprising 16 bytes, Bytes 15 . . . 0. The first two bytes, Bytes 15, 14, store a code, Code 0, Code 1, indicating that the gword stores as BTP Command and PCR Offset Entry 350. The next two bytes, Bytes 13, 12 store flag bytes, Flag byte 0, Flag byte 1. This field is used to indicate the validity of the BTP and PCR_OFFSET values in the entry. The following eight bytes, Bytes 11 . . . 4, can store a BTP command, BTP Cmd0 . . . BTP Cmd7, extracted from the Adaptation field of the BTP packet can be placed into this field. The last four bytes, Bytes 3 . . . 0 can store a PCR offset, PCR0 Offset . . . PCR3 Offset, calculated by the transport processor.

Referring now to FIG. 3D, there is illustrated a block diagram describing an exemplary start code entry 375. The start code entry stores 375 can store a non-slice start code, and each slice start code following the non-slice start code, until the next non-slice start code.

The start code entry 375 consumes a gword comprising 16 bytes, Bytes 15 . . . 0. The first two bytes, Bytes 15, 14, store a code, code 0, code 1, indicating that the gword stores a start code entry 375. The remaining bytes, Bytes 13 . . . 0 store start code values, SC value, and byte offsets, Byte Offset, in alternating order. As many as seven start code values, SC0 Value . . . SC6 Value, and byte offsets, Byte Offset 0 . . . Byte Offset 6, can be stored.

The start code values, SC0 Value . . . SC6 Value are valid if the corresponding byte offset, Byte Offset 0 . . . Byte Offset 6 does not store a 0xFF value. The byte offset, Byte Offset 0 . . . Byte Offset 6 is the offset in bytes from the Base address to the address storing the start code, SC0 Value . . . SC6 Value in the compressed data buffer. When the byte offset=0xFF it indicates the SC value associated with this offset is invalid and the SC value in the previous pair is the last valid Start code in this entry. The video decoder can halt parsing beyond the Byte offset with 0xFF.

Figure 4A:
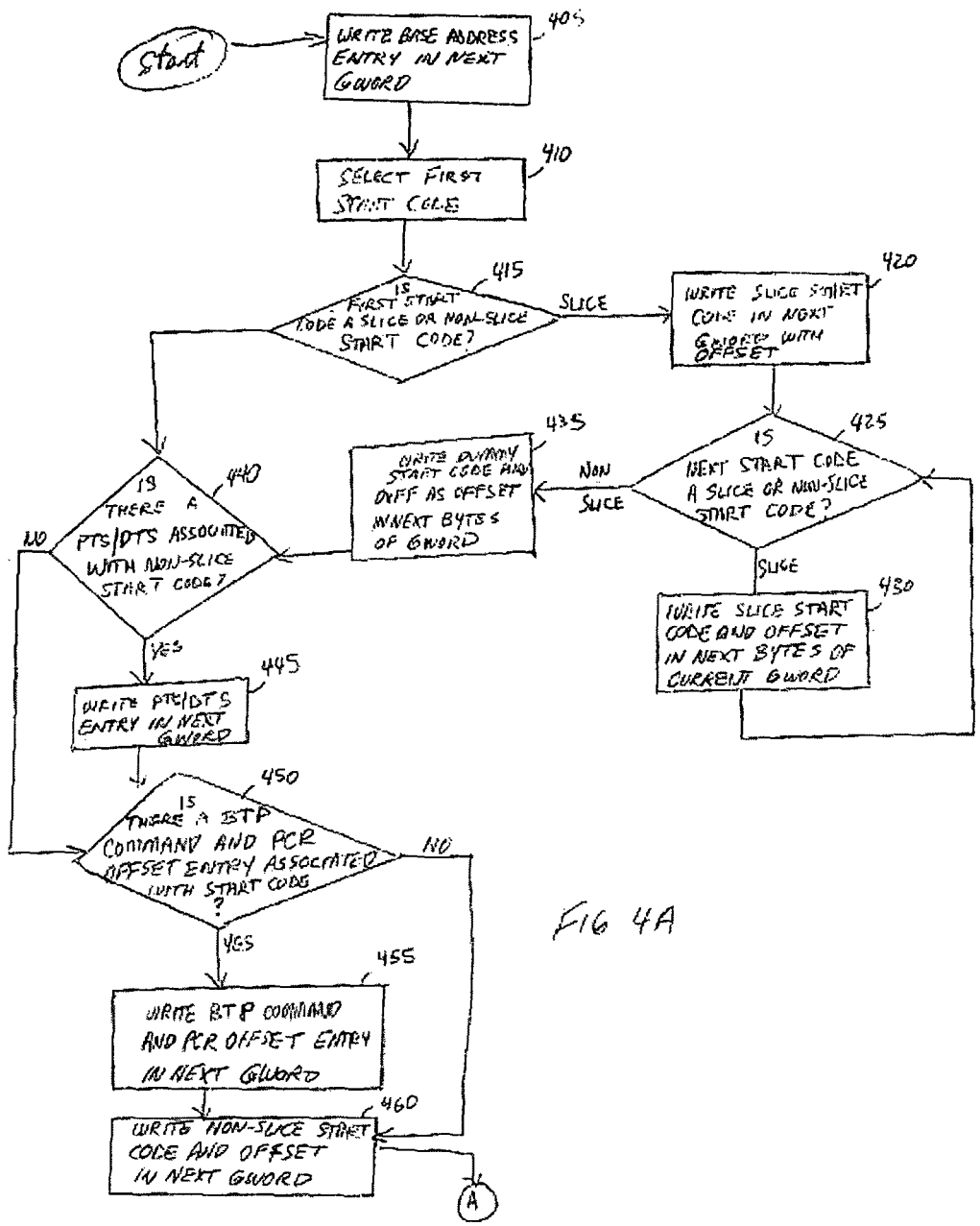
FIGS. 4A and 4B are a flow diagram for marking start codes in a transport packet in accordance with an embodiment of the present invention.
Figure 4B:
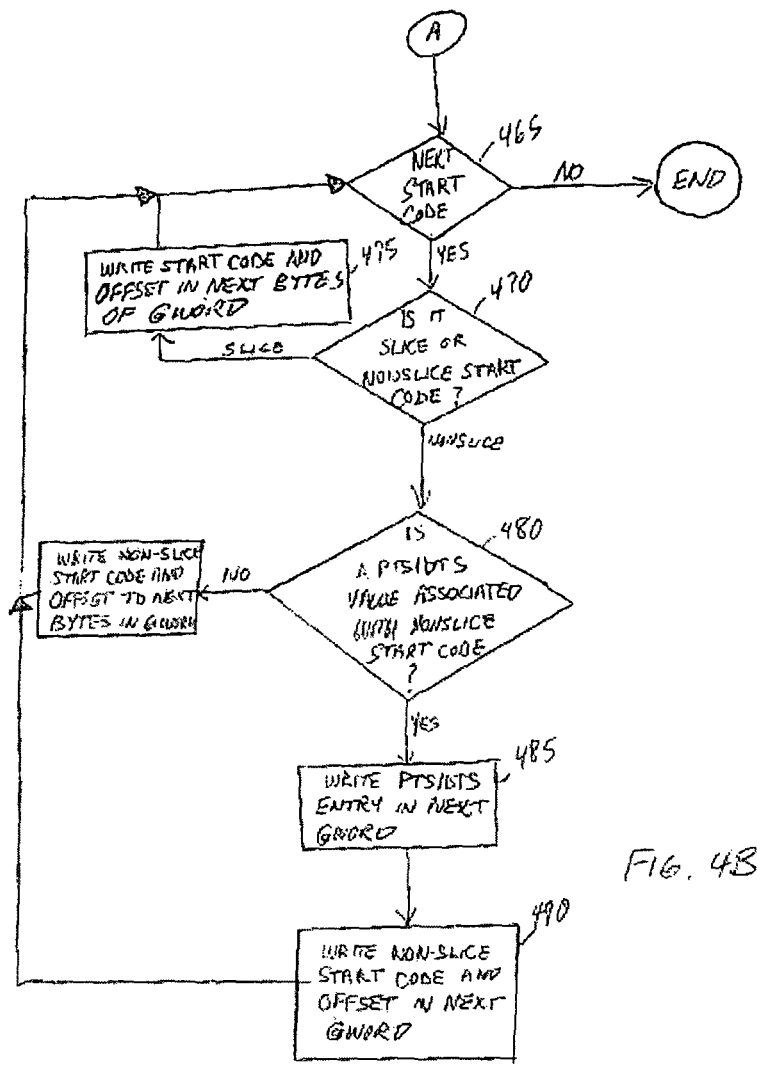

Referring now to FIGS. 4A and 4B, there is illustrated a flow diagram describing the operation of the video transport processor 218 in accordance with an embodiment of the present invention. Starting with FIG. 4A, at 405 the video transport processor 218 writes a CDB entry 300 for the transport packet into the next gword of the start code table 225.

At 410, the video transport processor 218 selects the first start code in the transport packet. At 415, the video transport processor 218 determines whether the first start code in the transport packet is a slice start code, or a non-slice start code.

If the first start code is a slice start code, the video transport processor 218 writes the slice start code, and the offset to the next gword at 420. At 425, a determination is made whether the next start code is a slice start code or a non-slice start code. Each subsequent start code and corresponding offset are written in the subsequent bytes of the current gword at 430 in the start code table 225, until a non-slice start code is found during 425. When a non-slice start code is found during 425, the video transport processor 218 writes another entry at 435 in the next bytes of the gword, including a dummy start code and the offset 0xFF, indicating that the dummy start code is not valid, and that there are no more start codes in the gword.

Where the first start code is a non-slice start code during 415 or after 435, the video transport processor 218 makes a determination at 440 whether the non-slice start code is associated with a PTS/DTS. If the non-slice start code is associated with a PTS/DTS, then the video transport processor 218 writes a PTS/DTS entry in the next gword in the start code table 225 at 445. If the non-slice start code is not associated with a PTS/DTS, 445 is bypassed.

At 450, the video transport processor 218 determines whether there is a BTP Command and PCR offset associated with the non-slice start code. If there is a BTP Command and PCR offset associated with the non-slice start code at 450, the video transport processor 218 writes (455) a BTP command and PCR offset entry into the next gword of the start code table 225. If there is not a BTP Command and PCR offset associated with the non-slice start code at 450, 455 is bypassed. At 460, the video transport processor 218 writes the non-slice start code and offset to the next gword in the start code table 225.

Moving to FIG. 4B, at 465, a determination is made whether there is another start code in the transport packet. If there is another start code in the transport packet at 465, a determination is made at 470 whether the next start code is a slice start code or a non-slice start code. If the next start code is a slice start code at 470, the video transport processor 218 writes the start code and an offset in the next bytes of the gword at 475. The video transport processor returns to 465.

If at 470, the next start code is a non-slice start code, the video transport processor 218 determines at 480, whether there is PTS/DTS value associated with the non-slice start code. If at 480, the video transport processor 218 determines there is a PTS/DTS value associated with the non-slice start code, the video transport processor 218 at 485 writes a PTS/DTS entry in the next gword of the start code table 225, and writes the non-slice start code in the next gword of the start code table 225 at 490.

If at 480, the video transport processor 218 determines there is not a PTS/DTS value associated with the non-slice start code, the video transport processor 218 writes at 495, the non-slice start code and offset in the next bytes of the gword. The foregoing, 465-490 are repeated until there are no more start codes in the transport packet at 465.

The foregoing is now further explained with the following illustrative examples of start code table 225 entries for certain transport packets.

Referring now to FIG. 5, there is illustrated a block diagram describing the start code table 225 entry for a transport packet, wherein the start code packet includes the following start codes: Non-Slice Start Code (NSL)1 Slice Start Code (SL)1 SL2 SL3 with a new PTS/DTS, BTP Command, and PCR offset.

The start code table 225 entry includes a base address entry 300 in one gword, Gword0, a PTS/DTS entry 325 in the next gword, gword1, a BTP Command and PCR Offset Entry 350 in the next gword 2, and a start code entry 375 in the next gword, gword3. The start code entry 375 includes the start codes and offsets for NSL1, SL1, SL2, and SL3. The start code entry 375 also includes a dummy start code, XX, with the corresponding offset set to 0xFF to indicate that there are no other start codes in gword3.

Referring now to FIG. 6, there is illustrated a block diagram of the start code table entry for a transport packet with the start codes: NSL1 SL1 SL2 SL3 and no new PTS/DTS, BTP Command, PCR offset. The start code table entry includes a base address entry 300 and a start code entry 375. The start code entry 375 includes the start codes and offsets for NSL1, SL1, SL2, and SL3. The start code entry 375 also includes a dummy start code, XX, with the corresponding offset set to 0xFF to indicate that there are no other start codes in gword1.

Referring now to FIG. 7, there is illustrated a block diagram for a start code table entry for a transport packet with the start codes: SL1, SL2, SL3 and a new PTS/DTS, BTP Command, and PCR offset.

The start code table entry includes a base address entry 300 and a start code entry 375. The start code entry 375 includes the start codes and offsets for SL1, SL2, and SL3. The start code entry 375 also includes a dummy start code, XX, with the corresponding offset set to 0xFF to indicate that there are no other start codes in gword1.

Although the transport packet includes a new PTS/DTS, BTP Command, and PCR offset, the video transport processor 218 does not write a PTS/DTS entry or BTP Command and PCR offset entry because the transport packet does not include a non-slice start code.

Referring now to FIG. 8, there is illustrated a block diagram of an exemplary start code table entry for a transport packet with the start codes NSL1 SL1 NSL2 SL2, a new BTP Command, and PCR offset, and a new PTS/DTS associated with NSL1.

The start code table 225 entry includes a base address entry 300 in one gword, Gword0, a PTS/DTS entry 325 in the next gword, gword1, a BTP Command and PCR Offset Entry 350 in the next gword 2, and a start code entry 375 in the next gword, gword3. The start code entry 375 includes the start codes and offsets for NSL1, SL1, SL2, and SL3. The start code entry 375 also includes a dummy start code, XX, with the corresponding offset set to 0xFF to indicate that there are no other start codes in gword3.

Referring now to FIG. 9, there is illustrated a block diagram of a start code table entry for a transport packet the includes start codes: NSL1 SL1 NSL2 SL2, a new PCR offset, and BTP Command, and a new PTS/DTS associated with NSL2.

The start code table entry includes a base address entry 300 in the first gword, gword0, a BTP command and PCR Offset entry 350 in the next gword, gword1, a first start code entry 375 in the next gword, gword2, a PTS/DTS entry 325 in the next gword, gword3, and a second start code entry 375 in the next gword, gword4.

The BTP command and PCR Offset entry 350 are written before the first non-slice start code, NSL1. Since the PTS/DTS information is associated with NSL2, the PTS/DTS entry 325 is written immediately before NSL2, and after SL1. In the first start code entry 375, a dummy start code, XX, is written corresponding to an offset of 0xFF, indicating that there are no more start codes in the first start code entry 375 in gword2. Similarly, in the second start code entry 375, a dummy start code, XX, is written corresponding to an offset of 0xFF, indicating that there are no more start codes in the first start code entry 375 in gword4.

Referring now to FIG. 10, there is illustrated a block diagram describing the start code table entry for a transport packet including the start codes: NSL1 SL1 NSL2 SL2 NSL3 SL3 NSL4 SL4 NSL5 SL5 NSL6 and SL6, a new BTP Command, PCR offset, and new PTS/DTS associated with NSL1. The start code table entry includes a base address entry 300, a PTS/DTS entry 325, a BTP command and PCR Offset entry 350, a first start code entry 375, and a second start code entry 375.

Because the first start code is a non-slice start code, NSL1, and is associated with the PTS/DTS information, the a PTS/DTS entry 325, a BTP command and PCR Offset entry 350 are written prior the NSL1 in the first start code entry 375. The start codes NSL2, SL2, NSL3, SL3, and NSL4 are written in the first start code entry 375 following NSL1 in gword1. The remaining start codes, SL4, NSL5, SL5, NSL6, and SL6 are written in the second start code entry 375 in gword4, because there is no room for the start codes in gword3.

Referring now to FIG. 11, there is illustrated a block diagram describing an exemplary start code table entry for a transport packet with start codes: SL1, SL2, SL3, NSL1, and SL4, with a new BTP Command, a PCR offset, and a new PTS/DTS associated with NSL1.

The start code table entry includes a Base Address entry 300, a first start code entry 375, a PTS/DTS entry 325, a BTP Command and PCR Offset entry 350, and a second start code entry 375.

Because the non-slice start code NSL1 is associated with the PTS/DTS and is the first non-slice start code, the PTS/DTS entry 325 and the BTP command and PCR Offset entry 350 follow the first start code entry 375 with the start codes and offsets for SL1, SL2, and SL3. The BTP command and PCR Offset entry 350 are followed by the second start code entry 375 with the start codes and offsets for NSL1 and SL4.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device with various functions implemented as firmware. For example, the flow chart of FIGS. 4A and 4B can be implemented as a set of executable instructions in the memory.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method for decoding video data, the method comprising:
   writing a plurality of start codes to a first data word in a start code table, the start code table comprising a plurality of data words; and
   writing presentation time information or decoding time information to a second data word in the start code table; and
   wherein the plurality of start codes comprise a slice start code indicating a starting point of a picture slice, and a non-slice start code indicating a starting point of a picture or picture group, and
   wherein the writing of the plurality if start codes comprises, in response to a first start code of the plurality of start codes being the slice start code, writing the slice start code into the first data word,
   wherein the writing of the plurality of start codes comprises, in response to the first start code being the non-slice start code, writing the non-slice start code to the first data word, and the writing of the presentation time information or the decoding time information comprises, in response to the non-slice start code being associated with the presentation time information or the decoding time information, writing the presentation time information or the decoding time information to the second data word in the start code table.

2. The method of claim 1, wherein the presentation time information comprises a presentation time stamp.

3. The method of claim 1, wherein the decoding time information comprises a decoding time stamp.

4. The method of claim 1, further comprising:
   writing a command to the start code table.

5. The method of claim 4, further comprising:
   writing a reference clock offset to the start code table.

6. The method of claim 5, wherein the command and the reference clock offset are written to a third data word of the plurality of data words in the start code table.

7. A circuit for decoding video data, the circuit comprising:
   a start code table for storing start codes, the start code table comprising a plurality of data words; and
   a video transport processor configured to write a plurality of start codes to a first data word in the start code table,
   wherein the plurality of start codes comprise a slice start code indicating a starting point of a picture slice, and a non-slice start code indicating a starting point of a picture or picture group, and
   wherein the video transport processor is further configured to:
      in response to a first start code of the plurality of start codes being the slice start code, write the slice start code into the first data word, and
      in response to the first start code being the non-slice start code, write the non-slice start code to the first data word, and in response to the non-slice start code being associated with presentation time information or decoding time information, write the presentation time information or the decoding time information to a second data word in the start code table.

8. The circuit of claim 7, wherein the video transport processor is further configured to write the presentation time information to the start code table.

9. The circuit of claim 8, wherein the presentation time information comprises a presentation time stamp.

10. The circuit of claim 7, wherein the video transport processor is further configured to write the decoding time information to the start code table.

11. The circuit of claim 10, wherein the decoding time information comprises a decoding time stamp.

12. The circuit of claim 7, wherein the video transport processor is further configured to write a reference clock offset to the start code table.

13. The circuit of claim 12, wherein the video transport processor is further configured to write a command to the start code table.

14. The circuit of claim 13, wherein the command and the reference clock offset are written to a third data word of the plurality of data words in the start code table.

15. An article of manufacture comprising a non-transitory computer readable medium, the non-transitory computer readable medium storing a plurality of executable instructions, the plurality of executable instructions for:
   writing a plurality of start codes to a first data word in a start code table, the start code table comprising a plurality of data words; and
   writing a command and a reference clock offset to a second data word of the plurality of data words in the start code table, and
   wherein the plurality of start codes comprise a slice start code indicating a starting point of a picture slice, and a non-slice start code indicating a starting point of a picture or picture group,
   wherein the writing of the plurality of start codes comprises, in response to a first start code of the plurality of start codes being the slice start code, writing the slice start code into the first data word, and
   wherein the writing of the plurality of start codes comprises, in response to the first start code being the non-slice start code, writing the non-slice start code to the first data word, and the writing of the command and the reference clock offset comprises, in response to the non-slice start code being associated with the command and the reference clock offset, writing the command and the reference clock offset to the second data word in the start code table.

16. The article of manufacture of claim 15, further comprising:
writing presentation time information indicating timing of at least one of a plurality of pictures to be presented for display to the start code table.

17. The article of manufacture of claim 15, wherein the plurality of instructions further comprises instructions for writing decoding time information to the start code table.

18. The article of manufacture of claim 17, wherein the decoding time information comprises a decoding time stamp.

19. The circuit of claim 7, wherein the plurality of start codes written to a particular data word comprise a start code for a slice group and a start code for a picture.

20. The article of manufacture of claim 16,
wherein the presentation time information comprises a presentation time stamp.

21. The method of claim 1, wherein in response to a next start code is a slice start code, iteratively writing the next start code to the first data word until a non-slice start code is encountered.

22. The circuit of claim 7, wherein in response to a next start code is a slice start code, iteratively writing the next start code to the first data word until a non-slice start code is encountered.

23. The article of manufacture of claim 15, wherein in response to a next start code is a slice start code, iteratively writing the next start code to the first data word until a non-slice start code is encountered.

* * * * *